US012704111B2

(12) United States Patent
Kaarsholm

(10) Patent No.: US 12,704,111 B2
(45) Date of Patent: Aug. 11, 2026

(54) PRECISE DETERMINATION OF ANGULAR POSITION OF A WIND TURBINE NACELLE

(71) Applicant: Siemens Gamesa Renewable Energy A/S, Brande (DK)

(72) Inventor: Soeren Majdal Kaarsholm, Copenhagen N (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 19/122,769

(22) PCT Filed: Oct. 10, 2023

(86) PCT No.: PCT/EP2023/078074
§ 371 (c)(1),
(2) Date: Apr. 21, 2025

(87) PCT Pub. No.: WO2024/099666
PCT Pub. Date: May 16, 2024

(65) Prior Publication Data
US 2026/0153075 A1 Jun. 4, 2026

(30) Foreign Application Priority Data
Nov. 7, 2022 (EP) .................................... 22205774

(51) Int. Cl.
*F03D 7/04* (2006.01)
*F03D 7/02* (2006.01)
(Continued)

(52) U.S. Cl.
CPC ........... *F03D 7/049* (2023.08); *F03D 7/0204* (2013.01); *G01B 7/30* (2013.01); *G01D 5/20* (2013.01); *F05B 2270/329* (2013.01)

(58) Field of Classification Search
CPC ........ F03D 7/049; F03D 7/048; F03D 7/0204; F03D 7/0202; F03D 1/181; F03D 17/029;
(Continued)

(56) References Cited

U.S. PATENT DOCUMENTS

2010/0001718 A1* 1/2010 Howard .................. G01B 7/30 324/207.15
2010/0133825 A1* 6/2010 Gao ........................ G01B 7/30 290/44
(Continued)

FOREIGN PATENT DOCUMENTS

CN 113 586 336 A 11/2021
CN 114 413 876 A 4/2022
(Continued)

OTHER PUBLICATIONS

International Search Report & Written Opinion for PCT/EP2023/078074, mailed Dec. 21, 2023.

*Primary Examiner* — Nathaniel E Wiehe
*Assistant Examiner* — Wayne A Lambert
(74) *Attorney, Agent, or Firm* — Schmeiser Olsen PLLC

(57) ABSTRACT

A method of determining an angular position of a nacelle of a wind turbine is provided, the nacelle being rotatably mounted at an upper end of a tower, the lower end of the tower being supported by a foundation. The method includes obtaining and storing a foundation angular position corresponding to a foundation reference point, the foundation angular position being relative to true north, determining a tower angular position based on the foundation angular position and information indicative of an angular relation between foundation and tower, the tower angular position corresponding to a tower reference point, receiving an encoder signal indicative of the angular position of the nacelle, detecting that a sensor mounted to the nacelle is the encoder signal such that the indicated angular position of the nacelle corresponds to the tower angular position. Furthermore, a controller for a wind turbine, a wind turbine, and a wind farm are provided.

13 Claims, 3 Drawing Sheets

(51) Int. Cl.
*G01B 7/30* (2006.01)
*G01D 5/20* (2006.01)

(58) Field of Classification Search
CPC .................... F05B 2270/204; F05B 2270/329; G01D 5/20
See application file for complete search history.

(56) References Cited

U.S. PATENT DOCUMENTS

| | | | | |
|---|---|---|---|---|
| 2015/0240783 | A1* | 8/2015 | Kii | F03D 7/0204 290/44 |
| 2016/0032897 | A1* | 2/2016 | Hawkins | G01S 3/54 342/417 |
| 2017/0175710 | A1* | 6/2017 | Egedal | F03D 13/30 |
| 2018/0372886 | A1* | 12/2018 | Weber | G01S 19/53 |
| 2022/0010769 | A1 | 1/2022 | Post et al. | |
| 2022/0065227 | A1* | 3/2022 | Dalsgaard | F03D 17/00 |
| 2022/0325699 | A1* | 10/2022 | Landa | F03D 17/00 |
| 2023/0014873 | A1* | 1/2023 | Thomsen | F03D 17/00 |

FOREIGN PATENT DOCUMENTS

| | | | | | |
|---|---|---|---|---|---|
| EP | 2599993 | A1 | * | 6/2013 | F03D 17/00 |
| EP | 2902623 | A1 | * | 8/2015 | F03D 80/85 |
| EP | 3 862 562 | A1 | | 8/2021 | |
| GB | 2581403 | A | * | 8/2020 | G06T 7/73 |

* cited by examiner

PRECISE DETERMINATION OF ANGULAR POSITION OF A WIND TURBINE NACELLE

CROSS REFERENCE TO RELATED APPLICATIONS

This application is a national stage of PCT Application No. PCT/EP2023/078074, having a filing date of Oct. 10, 2023, which claims priority to EP Application No. 22205774.7, having a filing date of Nov. 7, 2022, the entire contents both of which are hereby incorporated by reference.

FIELD OF TECHNOLOGY

The following relates to the field of wind turbine generators, in particular the following relates to a method of determining an angular position of a nacelle of a wind turbine. Furthermore, the following relates to a controller for a wind turbine, a wind turbine, and a wind farm.

BACKGROUND

As part of the efforts towards optimizing power production in modern wind farms, farm level control strategies that involve so-called wake steering or wake adapt methods have been developed. These control strategies aim at reducing the impact of wakes from some wind turbines on other wind turbines in the wind farm. In short, the idea is that an upwind wind turbine may be turned (yawed) slightly out of the wind in order to redirect the wake correspondingly and thereby cause less or no wake for a downwind wind turbine behind it. Although this will also result in a slight reduction of the power production at the upwind wind turbine, a corresponding increase in the power production at the downwind wind turbine (as compared to the situation where the downwind wind turbine is located directly in the wake of the upwind wind turbine) may more than compensate this reduction and thus lead to a net increase in total power production.

For wind farm control strategies that involve wake steering or wake adapt methods, it is a mandatory prerequisite to have very precise information available on position and orientation (angular position) of each single wind turbine within the wind farm. With regard to orientation, it is necessary to have a common reference among the wind turbines. Without a common reference, such as true north, the wind turbines of the wind farm will not be able to know the location of each other and will therefore not be able to act in accordance with farm level control strategies that utilize technologies like wake steering.

If a windfarm is using wake steering in a farm level control strategy, but the turbines of the given farm are not correctly north calibrated, or if the calibration is too unprecise (e.g., ±2 degrees), then the expected increase in AEP (Annual Energy Production), which may be obtained as a result of the control strategy, may drop significantly and even turn into a direct AEP decrease.

State of the art wind turbines have no way of directly determining their orientation relative to true north. Only through the use of extensive, time consuming and somewhat uncertain data collection campaigns can such data be pushed to the turbines.

Currently, many wind turbines are calibrated towards magnetic north upon commissioning through the use of a simple compass. This process is highly inaccurate and does not provide the turbine with the necessary position of the fixed true geographic north, but rather the fluctuating magnetic north. From this point in time no further calibration is done and the turbines yaw position signal relative to the estimated magnetic north can drift into further uncertainty due to so-called yaw sliding (the signals of some turbines have been seen to show the turbine pointing west at 270 degrees when in reality it was pointing east at 90 degrees).

One current approach for wind farms to run or implement wake steering in a farm level control strategy, is to perform a three-month long calibration campaign with intensive data collection, where the true north of a turbine is deduced by comparing the power production of the given turbine for all directions (360 degrees) and comparing that with simulations. The wakes of the nearby wind turbines will show as dips in the power production curve. By applying a phase shift to this curve to fit it with the similar curve produced by simulations, the yaw offset of the given wind turbine relative to the known GPS position of the nearby wind turbine will be equal to the amount of degrees phase shift. From this, the wind turbine's position relative to true north can be determined. During this 3-month long data collection campaign, wake steering cannot be deployed, therefore the wind farm operator will be missing out on the potential AEP increase during this period.

There may thus be a need for a simpler and less expensive (in terms of time, effort, and lost revenue) approach to allowing wind parks to effectively utilize wake steering techniques.

SUMMARY

An aspect relates to a method of determining an angular position of a nacelle of a wind turbine, the nacelle being rotatably mounted at an upper end of a tower, the lower end of the tower being supported by a foundation. In embodiments, the method comprises (a) obtaining and storing a foundation angular position corresponding to a foundation reference point, the foundation angular position being relative to true north, (b) determining a tower angular position based on the foundation angular position and information indicative of an angular relation between foundation and tower, the tower angular position corresponding to a tower reference point, (c) receiving an encoder signal indicative of the angular position of the nacelle, (d) detecting that a sensor mounted to the nacelle is located in the vicinity of the tower reference point, and (e) in response to the detecting: updating the encoder signal such that the indicated angular position of the nacelle corresponds to the tower angular position.

This aspect of embodiments of the invention is based on the idea that the foundation angular position, which is the angular position of a foundation reference point relative to true north, is used together with information on an angular relation between foundation and tower to determine a tower angular position as the angular position of a tower reference point. In other words, the obtained and stored foundation angular position is used together with the angular relation to determine the tower angular position relative to true north. The tower angular position is then used (during operation of the wind turbine) to update an encoder signal which is indicative of the angular position of the nacelle (also referred to as the yaw angle of the wind turbine) such that the angular position indicated by the encoder signal is correct. More specifically, this updating is done each time it is determined that the nacelle is in a known position, i.e., when a sensor on the nacelle detects that it is in the vicinity of (or passes) the tower reference point. When this occurs, the encoder signal is updated to indicate an angular position of the nacelle that corresponds to the (known) tower angular position. In other words, each time the nacelle is in a known angular position relative to the tower (corresponding to the tower angular position), the encoder signal is updated (corrected or recalibrated) such that any deviation in the encoder signal is minimized. As a result, the angular position of the nacelle relative to true north will be available with high precision for wind turbine control (and other purposes).

In the present context, the term "angular position" may in particular denote an angle of a direction relative to a predetermined reference, in particular relative to true north. Hence, an angular position of 0° may correspond to true north, 90° may correspond to true east, 180° may correspond to true south, 270° may correspond to true west, etc.

In the present context, the term "angular position of the nacelle" may in particular denote the yaw angle of the wind turbine relative to a predetermined reference, in particular relative to true north. In other words, the "angular position of the nacelle" indicates the current direction of the nacelle, typically coinciding with the axial direction of generator and rotor.

In the present context, the term "foundation angular position" may in particular denote the direction or orientation of the foundation, in particular it may denote the angular position of a predetermined reference point (foundation reference point) on the foundation, e.g., on a side wall or surface of the foundation. Similarly, the term "tower angular position" may in the present context in particular denote the angular position of a predetermined reference point (tower reference point) on the tower, e.g., on a side wall or surface of the tower.

In the present context, the term "angular relation" may in particular denote information on a difference (as a matter of construction and design) in rotational angle between different objects, parts or sections of the wind turbine, in particular between respective reference points on such objects. It should be noted that the angular relation may comprise relative angle information for several (more than two) objects, parts or sections relative to each other such that the angular relation corresponds to a sum of the corresponding relative angle information for the entire construction.

In the present context, the term "encoder signal" may in particular denote a signal from an encoder tracking the rotation (yawing) of the nacelle relative to the tower.

In embodiments, the method according to the first aspect of embodiments of the present invention allows determination of the angular position (yaw angle) of the nacelle relative to true north in a simple yet very precise manner. In embodiments, the method utilizes a foundation angular position and an angular relation as prerequisites to determine the tower angular position relative to true north. Having the tower angular position relative to true north available, embodiments of the method rely on an encoder and a sensor, which are usually already available in most wind turbines, to keep track of the angular position of the nacelle relative to true north by updating the encoder signal each time the sensor on the nacelle passes the tower reference point.

According to an embodiment of the invention, obtaining the foundation angular position comprises determining the angular position of the foundation reference point before, during, and/or after installation of the foundation.

In other words, the angular position of the foundation reference point may for example be determined prior to the installation of the foundation, such as from constructional data which allow derivation of the (expected) angular position of the foundation reference point. Alternatively, or additionally, the angular position of the foundation reference point may be obtained during the installation process, for example by measurements utilizing a high-precision GPS-based technology. Further alternatively, or additionally, the angular position of the foundation reference point may be obtained after installation of the foundation is complete, for example by GPS-based measurements. It should be emphasized that combinations are possible, where several values of the angular position of the foundation reference point obtained at different times or stages, such as before, during and/or after installation of the foundation, may be combined to form a final value of the foundation angular position.

According to a further embodiment of the invention, the angular relation between foundation and tower is indicative of a difference in angular position between the foundation reference point and the tower reference point.

In other words, the angular relation indicates how many degrees one would have to move on a circumferential circle around the tower axis in order to get from a location corresponding to the foundation reference point to a location corresponding to the tower reference point.

The angular relation may in particular be derived from construction data and/or from one or more measurements.

According to an embodiment of the invention, the angular relation between foundation and tower comprises a plurality of angular relations each of which is indicative of a difference in angular position between predetermined reference points of adjacent sections of the tower.

In other words, the angular relation comprises information on respective differences in angular position between predetermined reference points of adjacent tower sections. More specifically, the angular relation between foundation and tower may be formed by adding a number of angular differences corresponding to transitions along the tower, e.g., a first angular difference corresponding to a transition between foundation and a lower tower section, a second angular difference corresponding to a transition a transition between the lower tower section and an intermediate tower section, and a third angular difference corresponding to a transition between the intermediate tower section and an upper tower section. Each of these contributions may be derivable with high precision from the construction and design data of the wind turbine structure.

According to an embodiment of the invention, the encoder signal is provided by a yaw encoder.

The yaw encoder may in particular and as generally known in the conventional art comprise an encoder wheel mounted to an encoder structure on the nacelle such that it is coupled with a corresponding element, such as a flat or toothed structure along the circumference of the tower, in such a way that the encoder wheel rotates when the yaw angle changes. The encoder signal may in particular be (or be derived) from detection of a signed count of encoder wheel rotations.

According to an embodiment of the invention, the sensor is configured to detect a sensor activation element located at the tower reference point.

In other words, the sensor activation element is arranged in or on the tower surface in such a way that the sensor is activated (by detecting the sensor activation element) when the angular position of the nacelle is such that the sensor is located in the vicinity of the tower reference point.

According to an embodiment of the invention, the sensor is an inductive sensor.

Inductive sensors are desirable, inter alia due to low cost and high robustness. However, depending on the circumstances, also other kinds of sensors may be contemplated, such as optical, electromagnetic, or acoustic sensors.

According to an embodiment of the invention, the step of updating the encoder signal comprises: (a) determining a difference between the angular position indicated by the encoder signal and the tower angular position, and (b) updating the encoder signal based on the determined difference, such that the angular position indicated by the updated encoder signal is equal to the tower angular position.

In other words, the updating of the encoder signal utilizes the determined difference between the angular position indicated by the encoder signal (prior to the update) and the known tower angular position and causes the updated encoder signal to be (at least momentarily) aligned with the true angular position relative to true north.

According to an embodiment of the invention, the step of updating the encoder signal comprises adding an offset value to the encoder signal, wherein the offset value is based on the determined difference.

In other words, the difference is compensated by adding the offset value to the encoder signal.

According to a further aspect of embodiments of the invention, there is provided a controller for a wind turbine, the wind turbine comprising a nacelle being rotatably mounted at an upper end of a tower, the lower end of the tower being supported by a foundation. The controller comprises (a) a memory unit storing a foundation angular position corresponding to a foundation reference point, the foundation angular position being relative to true north, and (b) a processing unit configured to (b1) determine a tower angular position based on the foundation angular position and information indicative of an angular relation between foundation and tower, the tower angular position corresponding to a tower reference point, (b2) receive an encoder signal indicative of the angular position of the nacelle, (b3) detect that a sensor mounted to the nacelle is located in the vicinity of the tower reference point, and (b4) in response to the detecting: update the encoder signal such that the indicated angular position of the nacelle corresponds to the tower angular position.

This aspect of embodiments of the invention is based on the same idea as the first aspect discussed above and is hence capable of providing at least the same advantageous technical effects in the framework of a wind turbine controller, i.e., a controller capable of performing embodiments of the method according to the first aspect as well as the methods of various embodiments thereof as discussed above.

In the present context, the term "memory unit" may particularly denote any form of data storage as known in the art. In particular, the "memory unit" may correspond to or be part of a larger controller memory. The memory unit may comprise a volatile and/or a non-volatile memory.

Furthermore, the memory unit may be or comprises a cache memory that temporarily stores data provided by the controller or received from an external source, such as a central database in the wind farm. Hence, the foundation angular position may be permanently stored in the memory unit, or it may be received from a central database and temporarily stored in the memory unit.

In the present context, the term "processing unit" may particularly denote a data processing unit, such as a CPU or a similar unit, or part of such data processing unit, which is capable of performing calculations and logical operations as needed to e.g., perform the steps of determining, receiving, detecting, and updating referred to above.

According to a further aspect of embodiments of the invention, there is provided a wind turbine comprising a controller according to the second aspect described above.

Hence, the aspect of embodiments of the invention utilizes the controller to provide the aforementioned technical effects and advantages in a wind turbine.

According to a further aspect of embodiments of the invention, there is provided a wind farm comprising (a) a plurality of wind turbines according to the third aspect, and (b) a wind farm controller in communication with the controller of each wind turbine.

Also, this aspect of embodiments of the invention utilizes the general principles of the first and second aspects discussed above to provide corresponding advantages, here on a wind farm level.

According to an embodiment of the invention, the wind farm controller is configured to apply a wake steering control algorithm.

By utilizing the very precise data on angular position of each wind turbine in the wind farm relative to a fixed reference, such as true north, it is possible to modify the yaw control of the individual wind turbines in such a way that the negative impact of wakes among neighboring wind turbines is reduced and the total energy production of the wind farm is correspondingly increased.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of the present invention are apparent from the examples of embodiments to be described hereinafter and are explained with reference to the examples of embodiments. The invention will be described in more detail hereinafter with reference to examples of embodiments. However, it is explicitly noted that the invention is not limited to the described exemplary embodiments.

BRIEF DESCRIPTION

Some of the embodiments will be described in detail, with references to the following Figures, wherein like designations denote like members, wherein.

DETAILED DESCRIPTION

Figure 1:
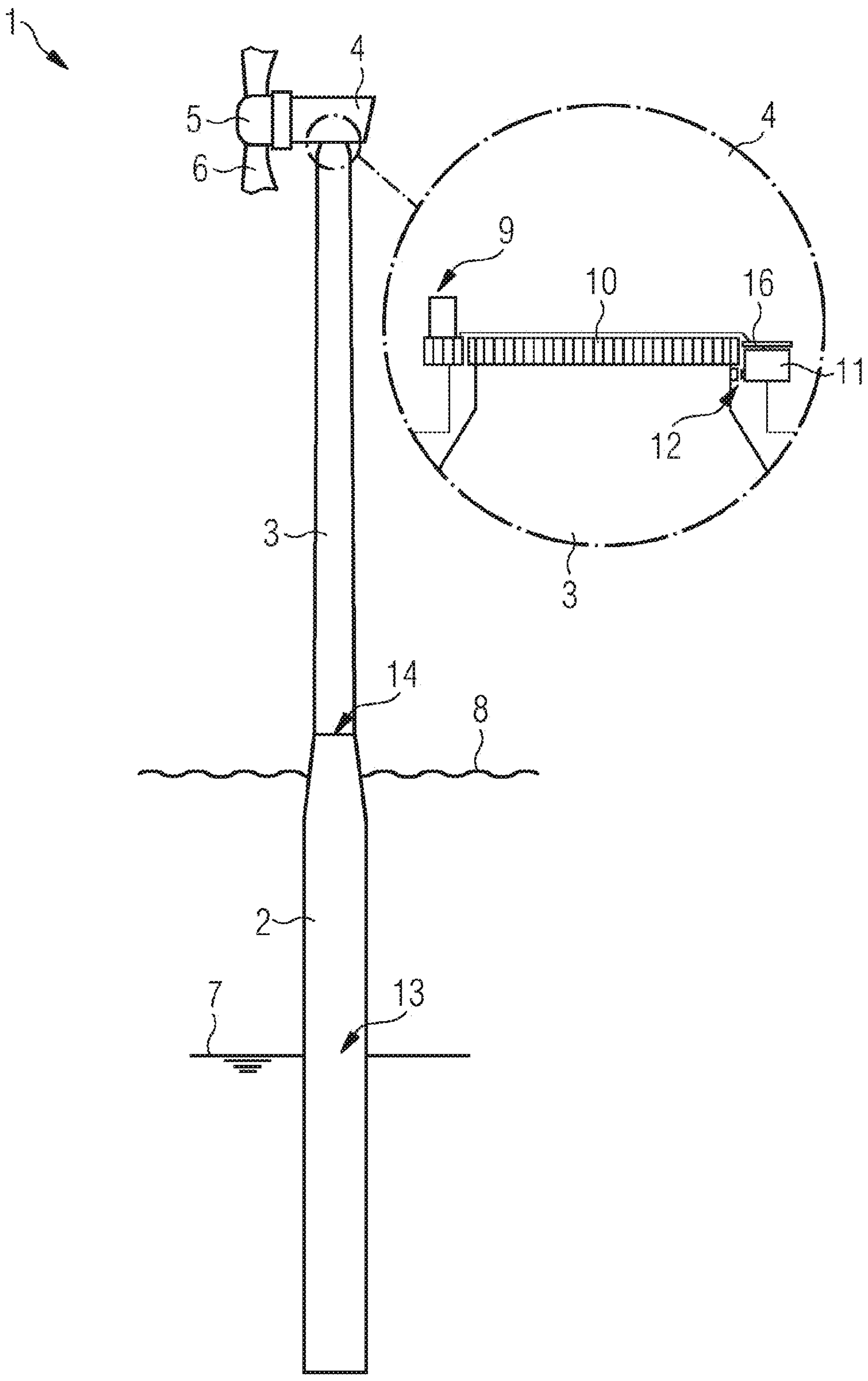
FIG. 1 shows a wind turbine in accordance with an exemplary embodiment of the present invention.

FIG. 1 shows a wind turbine 1 in accordance with an exemplary embodiment of the present invention. The wind turbine 1 is part of an offshore installation and comprises (in a well-known configuration) a foundation 2, a tower 3, and a nacelle 4 with hub 5 and rotor blades 6. The foundation 2 has an elongate structure and extends into the seabed 7 at its lower end. The foundation 2 is coupled to the tower 3 above the waterline 8 by an interface flange 14. The nacelle 4 is rotatably mounted at the upper end of the tower 3. More specifically, as shown in the blowup, a yaw motor (step motor) 9 is provided to rotate the nacelle around the tower axis by engaging with toothed rim 10 extending around a circumferential section of the tower 3. The yaw motor 9 can thereby rotate the nacelle 4 to point in any desired direction, such as directly into the wind. An encoder 11 is mounted to the nacelle 4 and configured to keep track of the yaw rotation as known in the art. More specifically, the yaw encoder 11 comprises an encoder wheel 16 engaging with the toothed rim 10. By detecting the corresponding rotation of the encoder wheel by appropriate sensors (not shown), an encoder signal is provided. The encoder signal is thus indicative of the angular position of the nacelle 4, i.e., the yaw angle. The yaw encoder 11 further comprises a sensor (not shown) which is configured to detect a sensor activation element 12 mounted at a tower reference point (not shown). In other words, the sensor is capable of detecting the sensor activation element 12 when the nacelle is turned (yawed) into a corresponding angular position. This sensor is usually provided to allow counting of full turns of the nacelle around the tower, which is an important information in wind turbine control in order to avoid damage to the cables inside the wind turbine that rotates with the nacelle. Finally, a foundation reference point 13 is shown on the surface of the foundation 2. The angular position of the foundation reference point 13 relative to true north (or another fixed reference) may be determined and stored for later use when the foundation and/or the remaining parts of the wind turbine 1 are installed.

It should be noted that the principles and functions of embodiments of the present invention described hereinafter are not only applicable to offshore wind turbines as the one depicted in FIG. 1 but also to any other wind turbine having a tower that is supported on a foundation. However, for ease of understanding, embodiments of the present invention will now be explained in further detail with continued reference to the structure shown in FIG. 1.

Figure 2:
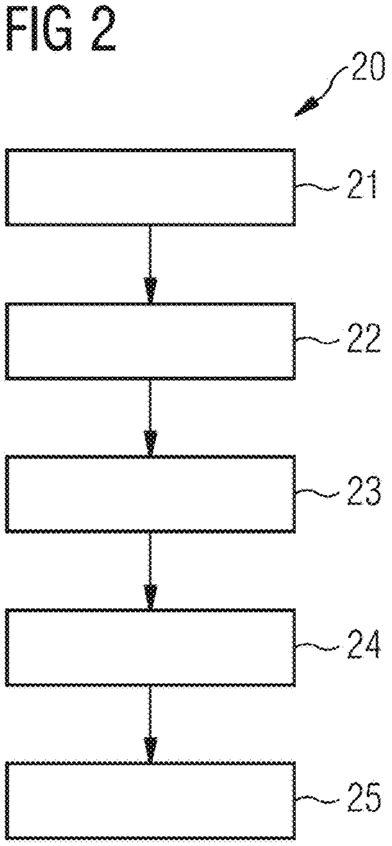
FIG. 2 shows a flowchart of a method in accordance with an exemplary embodiment of the present invention.

FIG. 2 shows a flowchart of a method 20 in accordance with an exemplary embodiment of the present invention. More specifically, embodiments of the method 20 begins at 21 with obtaining and storing a foundation angular position corresponding to the foundation reference point 13. The foundation angular position is determined relative to true north, for example by utilizing a GPS device.

Then, at 22, embodiments of the method continues by determining a tower angular position based on the foundation angular position and information indicative of an angular relation between foundation 2 and tower 3. The tower angular position corresponds to a tower reference point. This will be described in further detail below with reference to FIG. 3. At this stage, based on the tower angular position and the angular relation, the tower angular position (that is, the angular position of the tower reference point) is available relative to true north.

In embodiments, the method 20 then continues at 23 by receiving an encoder signal from the yaw encoder 11. The encoder signal is indicative of the current angular position of the nacelle 4, i.e., of the yaw angle.

At step 24, embodiments of the method 20 detects that the sensor (described in further detail below in conjunction with FIG. 4) is located in the vicinity of the tower reference point. Hence, it is determined at this stage that the nacelle is yawed into a direction that corresponds to the tower angular position. Thus, at this very moment the yaw angle relative to true north is known with high precision.

Finally, at step 25, embodiments of the method responds to the detection in step 24 by updating the encoder signal such that the indicated angular position of the nacelle 4 corresponds to the tower angular position. In other words, if the angular position indicated by the encoder signal deviates from the tower angular position, the encoder signal is adjusted to indicate the correct angular position. By repeating this process each time, the detection of the sensor (step 24) occurs, the encoder signal is capable of providing precise and reliable information on the actual angular position of the nacelle relative to true north. This is obtained solely by having the foundation angular position and the angular relation available-no new hardware is needed.

Figure 3:
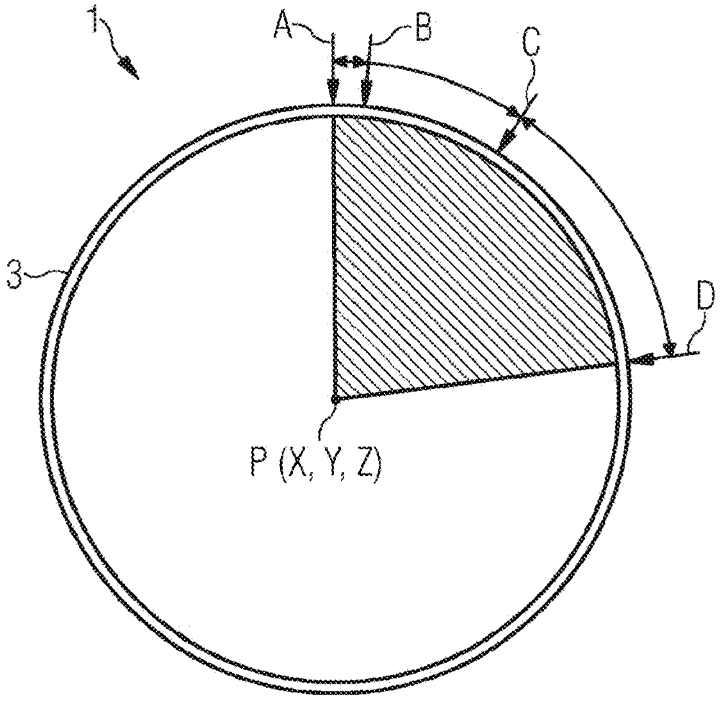
FIG. 3 shows a top view of a wind turbine in accordance with an exemplary embodiment of the present invention.

FIG. 3 shows a top view of a wind turbine 1 in accordance with an exemplary embodiment of the present invention. For ease of understanding, FIG. 3 does not show nacelle and rotor structure but merely the circumference of the wind turbine tower 3. The geographic location of the wind turbine 1 is indicated as a point P with three-dimensional GPS coordinates (X, Y, Z). Reference points A, B, C, D are shown along the circumference of the tower 3. More specifically, reference point A corresponds to the intended location of the foundation reference point 13 shown in FIG. 1, while reference point B corresponds to the actual location of the foundation reference point 13 after installation of the foundation. As can be seen, points A and B do not coincide, and the corresponding offset AB is relatively small, e.g., around 2.5°. Reference point C corresponds to an intermediate point on the tower 3 somewhere between the foundation 2 and the nacelle 4, for example a point at the interface flange 14 shown in FIG. 1. As can be seen, reference point C is offset relative to reference point B with an amount BC around 30°. Finally, reference point D corresponds to the tower angular position where the sensor activation element 12 is located. The offset CD from reference point C is about 50°. These offsets in sum, i.e., AB+BC+CD=82.5°, form the angular relation between foundation and tower referred to elsewhere in the present application and corresponds to the difference in angular position between the foundation reference point 13 and the tower reference point 12.

Figure 4:
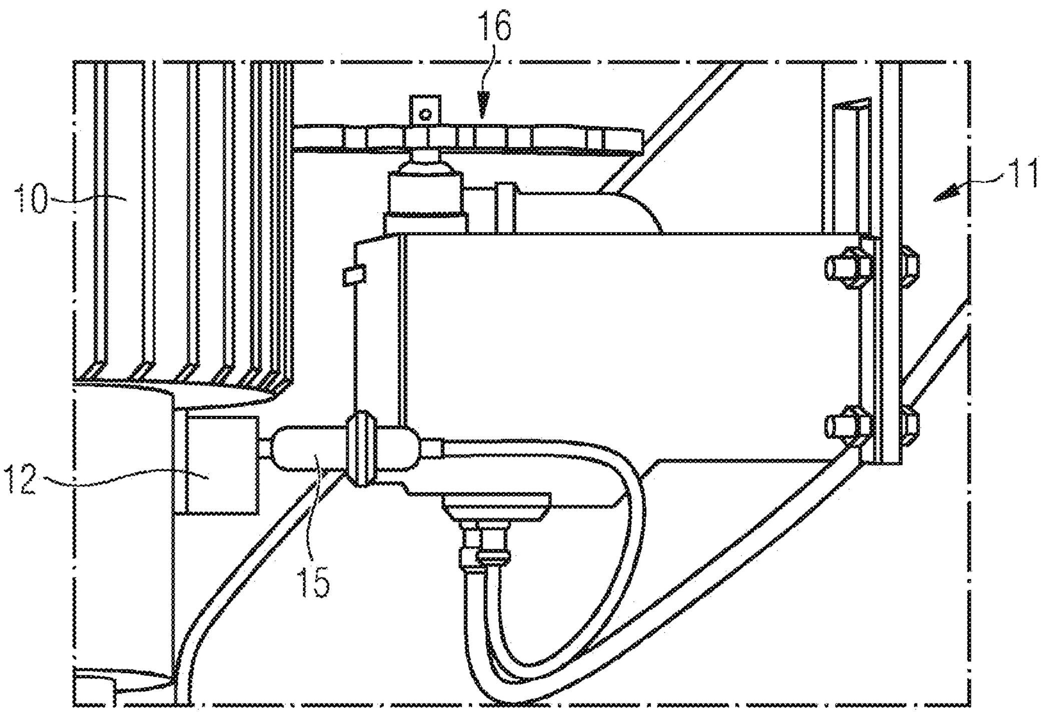
FIG. 4 shows an encoder and sensor on a wind turbine in accordance with an exemplary embodiment of the present invention.

FIG. 4 shows an encoder 11 and sensor 15 on a wind turbine 1 in accordance with an exemplary embodiment of the present invention. More specifically, the detailed view of FIG. 4 shows the encoder unit 11 which is mounted to the nacelle 4 (not shown in FIG. 4) and comprises sensor 15, an inductive sensor 15, and encoder wheel 16. The encoder wheel 16 engages with the toothed rim 10 on the tower 3 to count the corresponding rotational movement of the nacelle 3 relative to the tower 3 as known in the art. Below the toothed rim 10 and at the tower reference point D, sensor activation element 12, a magnetic material block, is shown. Hence, as also described above, when the nacelle is yawed to an angular position where the sensor 15 detects the sensor activation element 12, the angular position of the nacelle 4 relative to true north is known as being identical to the tower angular position. By continuously updating, in particular adjusting or recalibrating the encoder signal accordingly, each time the sensor 15 detects the activation element 12, very precise information on the angular position of the nacelle 4 relative to true north is made available in a simple and very reliable manner which only requires two pieces of information (namely the foundation angular position and the angular relation between foundation and tower) and corresponding processing as described above.

Precise information on the angular position is particularly useful and necessary in wind farms applying so-called wake steering control algorithms to avoid significant dips in power production at wind turbines located directly downwind of other wind turbines.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of determining an angular position of a nacelle of a wind turbine, the nacelle being rotatably mounted at an upper end of a tower, a lower end of the tower being supported by a foundation, the method comprising obtaining and storing a foundation angular position corresponding to a foundation reference point, the foundation angular position being relative to true north;

determining a tower angular position based on the foundation angular position and information indicative of an angular relation between the foundation and the tower, the tower angular position corresponding to a tower reference point;

receiving an encoder signal indicative of the angular position of the nacelle;

detecting that a sensor mounted to the nacelle is located in a vicinity of the tower reference point; and in response to the detecting updating the encoder signal such that the indicated angular position of the nacelle corresponds to the tower angular position.

2. The method according to claim 1, wherein obtaining the foundation angular position comprises determining the angular position of the foundation reference point before, during, and/or after installation of the foundation.

3. The method according to claim 1, wherein the angular relation between the foundation and the tower is indicative of a difference in angular position between the foundation reference point and the tower reference point.

4. The method according to claim 3, wherein the angular relation between the foundation and the tower comprises a plurality of angular relations each of which is indicative of a difference in angular position between predetermined reference points of adjacent sections of the tower.

5. The method according to claim 1, wherein the encoder signal is provided by a yaw encoder.

6. The method according to claim 1, wherein the sensor is configured to detect a sensor activation element located at the tower reference point.

7. The method according to claim 6, wherein the sensor is an inductive sensor.

8. The method according to claim 1, wherein updating the encoder signal comprises:

determining a difference between the angular position indicated by the encoder signal and the tower angular position; and updating the encoder signal based on the difference, such that the angular position indicated by the updated encoder signal is equal to the tower angular position.

9. The method according to claim 8, wherein updating the encoder signal comprises adding an offset value to the encoder signal, further wherein the offset value is based on the difference.

10. A controller for a wind turbine, the wind turbine comprising a nacelle being rotatably mounted at an upper end of a tower, a lower end of the tower being supported by a foundation, the controller comprising:

a memory unit storing a foundation angular position corresponding to a foundation reference point, the foundation angular position being relative to true north; and a processing unit configured to;

determine a tower angular position based on the foundation angular position and information indicative of an angular relation between the foundation and the tower, the tower angular position corresponding to a tower reference point, receive an encoder signal indicative of the angular position of the nacelle, detect that a sensor mounted to the nacelle is located in a vicinity of the tower reference point, and in response to the detecting the sensor being located in the vicinity of the tower reference point, update the encoder signal such that the indicated angular position of the nacelle corresponds to the tower angular position.

11. The wind turbine comprising a controller according to the claim 10.

12. A wind farm comprising:

a plurality of wind turbines according to claim 11; and a wind farm controller in communication with the controller of each wind turbine.

13. The wind farm according to claim 12, wherein the wind farm controller is configured to apply a wake steering control algorithm.

* * * * *